United States Patent [19]

Hussey

[11] 4,400,625
[45] Aug. 23, 1983

[54] STANDBY A-C POWER SYSTEM WITH TRANSFER COMPENSATION CIRCUITRY

[75] Inventor: Sam W. Hussey, Lakewood, Ohio

[73] Assignee: Reliance Electric Company, Cleveland, Ohio

[21] Appl. No.: 325,974

[22] Filed: Nov. 30, 1981

[51] Int. Cl.³ .............................................. H02J 9/00
[52] U.S. Cl. ....................................... 307/66; 307/87
[58] Field of Search ..................... 307/66, 46, 48, 22, 307/23, 24, 26, 85, 86, 87

[56] References Cited

U.S. PATENT DOCUMENTS

| | | | |
|---|---|---|---|
| 3,337,743 | 8/1967 | Rolfes | 307/66 |
| 3,348,060 | 10/1967 | Jamieson | 307/66 |
| 3,389,268 | 6/1968 | Jamieson et al. | 307/66 |
| 3,746,878 | 7/1973 | Viger, Jr. | 307/66 |
| 4,238,691 | 12/1980 | Ebert, Jr. | 307/66 |

Primary Examiner—Michael L. Gellner
Assistant Examiner—Derek Jennings
Attorney, Agent, or Firm—Michael M. Rickin

[57] ABSTRACT

A transfer compensation circuit for use in a standby A-C power system which compensates for the transient in system output voltage which occurs when the system transfers from the conventional A-C input voltage to the standby power system. The compensation is dependent on the total load on the system at the instant of transfer. The total load includes both the external load connected to the system load and the battery in the standby supply if the system normally functions to provide charging current to that battery.

16 Claims, 7 Drawing Figures

STANDBY A-C POWER SYSTEM WITH TRANSFER COMPENSATION CIRCUITRY

CROSS-REFERENCE TO A RELATED APPLICATION

Of interest is the copending application entitled "Continuously Operating Standby A-C Power System", now U.S. Pat. No. 4,366,389, which was filed on July 13, 1981, also based on the invention of S. W. Hussey and assigned to the same assignee as the present application.

BACKGROUND OF THE INVENTION

1. Field of the Invention

The present invention relates to an automatic and continuously operating standby A-C power system and more particularly to circuitry included in such a system for compensating for, and thereby minimizing, the effect of the transient which occurs when the system switches from the conventional source of A-C power to the inverter and battery contained therein.

2. Description of the Prior Art

For many applications such as communications and data processing equipment it is desirable to provide a source of standby A-C power. The A-C voltage from a conventional source of power such as a power station is generally used either alone or in combination with a secondary reserve A-C power source such as a battery and an inverter to supply the equipment when that voltage is acceptable. The conventional voltage is, however, subject to power level fluctuations which may take the form of a blackout (complete loss of A-C power), a transient (momentary voltage excursion), an interrupt (momentary loss of power) or a brownout (long-lasting reduction in A-C power). Upon the occurrence of one or more of the conditions described above, the source automatically disconnects the conventional A-C voltage from the load. Power is then supplied to the load only from the inverter and battery contained therein. Upon restoration of the conventional or input A-C voltage the source will reconnect the line to the load and may also provide current for recharging the battery.

In one type of standby source known as the transfer type it is only the conventional A-C voltage which is normally used to provide power to the load external to the source. When the conventional A-C power is operating normally, the reserve source consisting of the battery and inverter mentioned above does not supply power to the load but operates in a standby condition. Upon the occurrence of one or more of the previously described conditions, the source automatically disconnects the conventional A-C voltage from the load and the standby inverter and battery supplies the load power.

In one such type of standby prior art source which is described in U.S. Pat. No. 3,348,060 (hereinafter the '060 patent) the inverter also operates bidirectionally and thereby serves to charge the battery from the conventional A-C when the source operates in its normal mode. In the kind of transfer type source described in the '060 patent it is necessary to control the phase angle between the output and conventional or input A-C voltages as a function of both the external load and the charge on the battery. In this manner current may be supplied from the line voltage for providing power to the external load and for charging of the battery if needed. The battery may be considered to be an internal load on the system, and the combination of external and internal loads will be referred to hereinafter as the total load on the system. Upon restoration of the A-C line voltage after the occurrence of one of the conditions described above, it is also desirable to slowly bring the source's output voltage into phase relationship with the A-C line before the line is reconnected to the load. This slow bringing into phase of the input and output voltages prevents undesirably large amplitude spikes from appearing at the source's output. A continuously adjustable phase-control circuit for use in the source described in the '060 patent is shown and described in U.S. Pat. No. 3,337,743 (hereinafter the '743 patent). A line control for use in the source described in the '060 patent is shown and described in U.S. Pat. No. 3,389,268 (hereinafter the '268 patent).

Since uninterruptible power sources or supplies are frequently used to supply power to data processing type circuits, the reserve power source must act quickly to supply power whenever the primary power source undergoes one of the previously described conditions in order to maintain the integrity of information in the data processing circuit.

The sudden transfer of total system load from the conventional A-C voltage to the A-C voltage generated by the combination of inverter and battery causes a momentary decrease in the amplitude of the source's output voltage. This decrease in amplitude, while relatively short in duration, does give rise to a transient which may cause undesirable effects in the external load. If the external load consists of data processing equipment, the transient may impair the integrity of the data contained therein. Such impairment may not be immediately evident. It is, therefore, desirable to compensate for and thereby minimize any detrimental effect that the transient may have on the external load when the source switches from the conventional A-C power to the reserve supply.

SUMMARY OF THE INVENTION

According to the present invention there is provided a transfer compensation circuit for use in an A-C power system of the type which provides to a load connected to its output a regulated A-C voltage from an input A-C voltage when the system operates in normal mode and from the output of a standby power system included in the supply when the system operates in the failure mode.

The compensation circuit includes circuitry for generating from a load indicating signal generated by the supply a signal which is indicative of the load connected to the system. When the system transfers from normal mode to failure mode, which transfer occurs upon the occurrence of one or more predetermined undesirable conditions in said input voltage, means in the transfer compensation circuit cause the load indicative signal to change in a predetermined manner from its normal mode amplitude to a predetermined amplitude.

When the system operates in the failure mode the standby output voltage is ordinarily controlled to have a predetermined amplitude by means located in the system. The compensation circuit includes means which respond to the system transfer for causing the standby output voltage to rise above the predetermined amplitude. Also included in the transfer compensation circuit are means which respond to the load indicative signal reaching the predetermined level for terminating the increase of standby output voltage. The standby voltage amplitude returns to the predetermined amplitude.

DESCRIPTION OF THE DRAWING

Referring to FIG. 1 there is shown the block-schematic diagram of an automatic standby A-C power system 10 which supplies uninterrupted 60 Hz A-C power to an external load such as a computer. A conventional 60 Hz power line is indicated at 12 having interposed therein a static switch 18. The input terminals of line 12 are indicated at 14 and are adapted to be connected to a suitable source of conventional A-C power such as a central power station. The output terminals of the line 12 are indicated at 16 and are adapted to be connected to the external load. Interposed between the static switch 18 and the output terminals 16 is a line inductor $L_1$.

Figure 1:
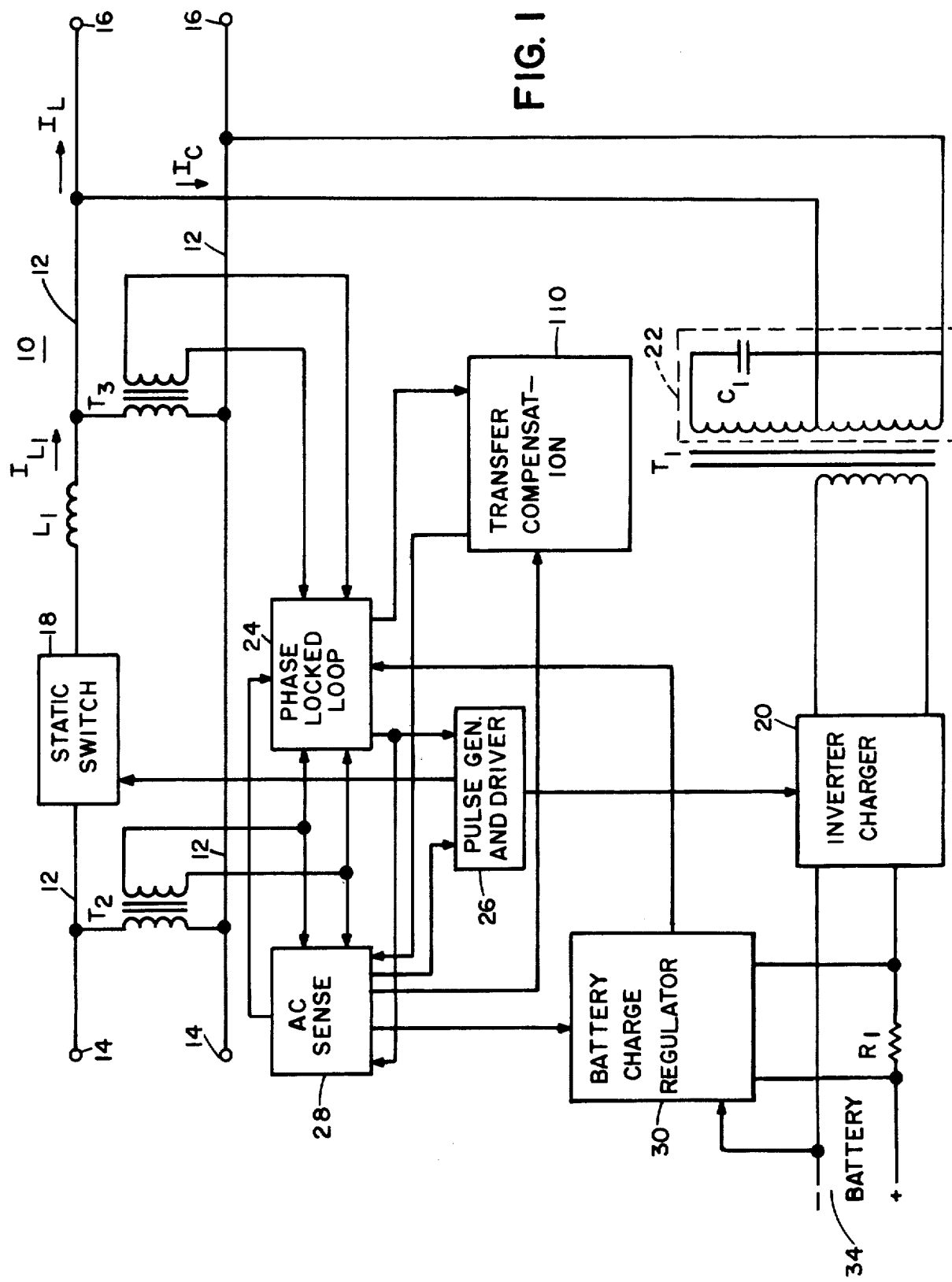
FIG. 1 is a block-schematic diagram illustrating one embodiment of the present invention.

Static switch 18 is adapted to open the line automatically in response to various undesired line conditions, for example, during periods when the magnitude of the line voltage is excessively low or when the frequency of the line voltage is higher or lower than predetermined limits. Each of these conditions results from a failure of the conventional A-C power which may occur in the form of a blackout, brownout, interrupt or transient. In the absence of undesired line conditions system 10 operates in a normal or nonfailure mode, whereas in the presence of one or more of such conditions the system operates in a failure mode.

For the nonfailure operating mode switch 18 conducts in a manner to apply the conventional A-C power to regulator 22. The regulator circuit is comprised of the secondary winding of ferroresonant transformer $T_1$ and capacitor $C_1$ connected thereacross to thereby form a tank circuit resonant at 60 Hz. The energy which circulates in this tank circuit is used to provide at output terminals 16 a regulated A-C voltage. Line inductor $L_1$ provides isolation between the input terminals 14 and the output terminals 16 of system 10. This isolation allows the voltage at terminals 16 to be relatively insensitive to changes in the voltage at terminals 14. Thus, for the nonfailure operating mode system 10 provides at its output terminals a regulated A-C voltage to the load.

Figure 5:
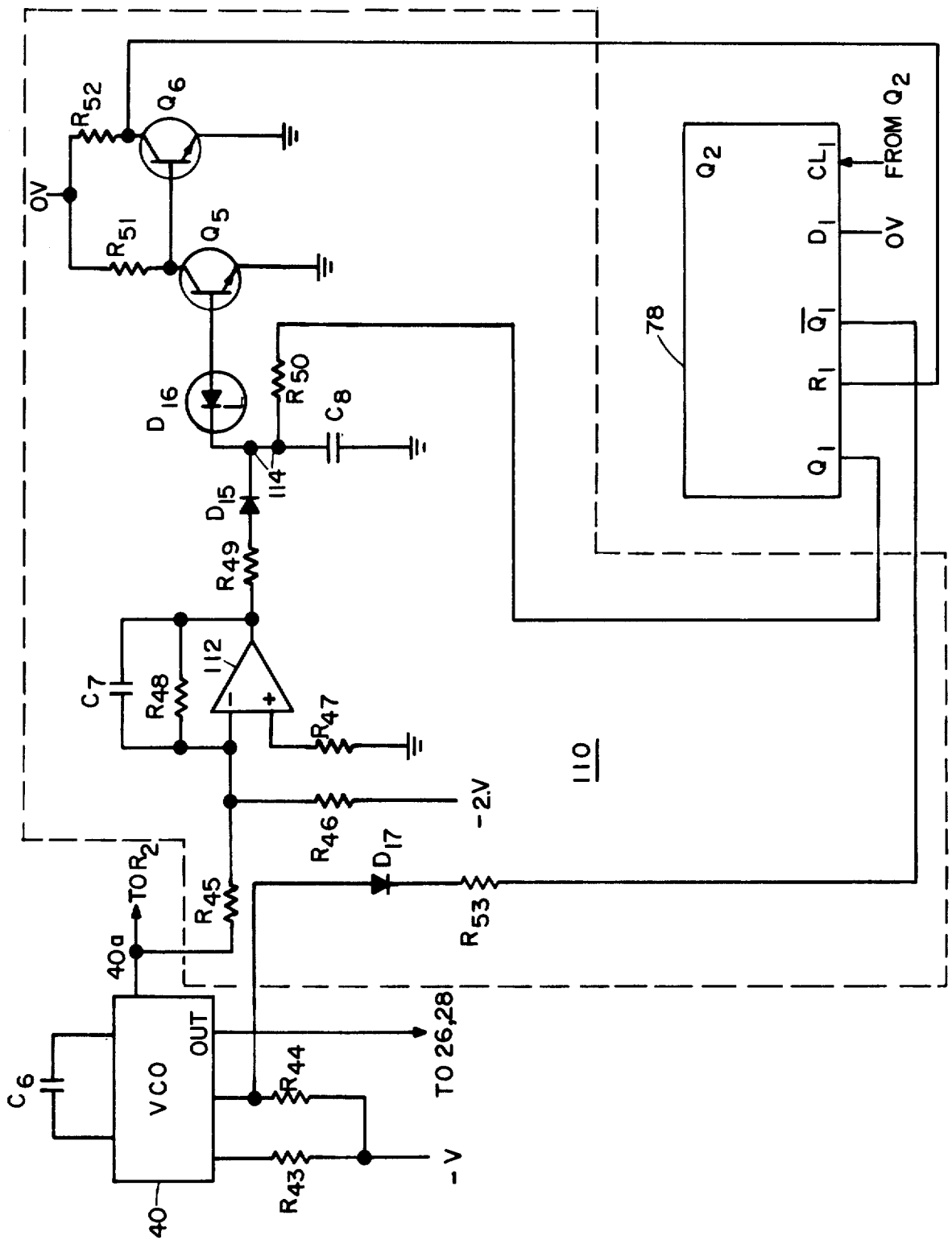
FIG. 5 is a schematic diagram of the transfer compensation circuit shown in FIG. 1.

Upon the occurrence of one or more of the undesired line conditions described above, the operation of switch 18 is inhibited thereby disconnecting the conventional A-C power from regulator 22. System 10 then supplies the load with a regulated A-C voltage which is generated from the D-C energy contained in battery 34. Inverter/charger 20 and regulator 22 operate in combination to convert the D-C energy of the battery into regulated A-C power for the load. Transfer compensation circuit 110, a detailed circuit schematic for which is shown in FIG. 5 to be described hereinafter, operates to provide compensation for the transient which occurs when system 10 switches from the normal mode to the failure mode of operation. The compensation minimizes any detrimental effect that the transient may have on the external load. Thus, for the failure operating mode system 10 also provides at its output terminals 16 a regulated A-C voltage to the load.

For the nonfailure operating mode inverter 20 operates continuously and in synchronism with the conventional A-C line frequency. The inverter does not (except as described below) supply power to the load for this mode of operation. Upon the failure of the conventional A-C power the inverter supplies power to the load through regulator 22. The inverter is coupled to the regulator through ferroresonant transformer $T_1$ which provides isolation between the D-C circuitry of the inverter and the A-C output circuits of system 10.

The inverter is bidirectional in operation and therefore also performs the function of charging battery 34 from the conventional A-C power. The battery may, therefore, also be considered to be a load on system 10 and in order to distinguish it from the external load it will be referred to as an internal load. Of course, such battery charging can only occur when system 10 is operating in the nonfailure mode. For the failure mode the battery provides power to the load. Even after restoration of the conventional A-C power, the battery continues to supply power to the load such time as switch 18 is operated to once again connect the conventional A-C power to regulator 22. Such operation of switch 18 occurs only after the A-C voltage generated by inverter 20 from the battery is synchronized in phase with the phase of the conventional A-C voltage. Such synchronization and, therefore, the change in energy sources from the battery to conventional A-C takes place slowly in the manner to be described hereinafter.

Upon closing of switch 18 and restoration of the conventional A-C power as the source of power for the load, it may be necessary to recharge the battery. Current for recharging the battery is obtained from the conventional A-C voltage by controlling the phase relationship between the A-C voltages at input terminals 14 and output terminals 16. Even when system 10 operates in the normal mode, inverter 20 functions to maintain battery 34 fully charged from the conventional A-C power.

The phase relationship between the voltages at terminals 14 and 16 of system 10 is controlled by phase locked loop 24 in the manner described below. When system 10 operates in the nonfailure mode, a current $I_L$ is supplied to the load which is essentially equal to the current $I_{L1}$ flowing in inductor $L_1$. In actuality, a small current is also drawn from the conventional A-C power to compensate for the losses in ferroresonant transformer $T_1$ and to trickle charge the battery. The battery supplies power for the various circuit components of system 10, and the current drawn from the conventional A-C power maintains the battery fully charged. For purposes of this discussion, this small current will be ignored. In order for system 10 to provide the current $I_L$ from the conventional A-C power, a voltage must exist across inductor $L_1$. A voltage will exist across $L_1$ if the A-C regulated voltage at terminal 16 is not in phase with the A-C voltage at terminal 14. The phase relationship between the voltages is determined by the nature of the load connected to terminal 16. It may be desired to not only provide the current $I_L$ but also a current $I_C$ to recharge battery 34. Recharging of the battery is usually necessary after system 10 has returned to the nonfailure mode of operation after operating in the failure mode. System 10 must then adjust the phase relationship between the voltages at terminals 14 and 16 to thereby provide both load and battery recharging currents from the conventional A-C power.

Figure 2:
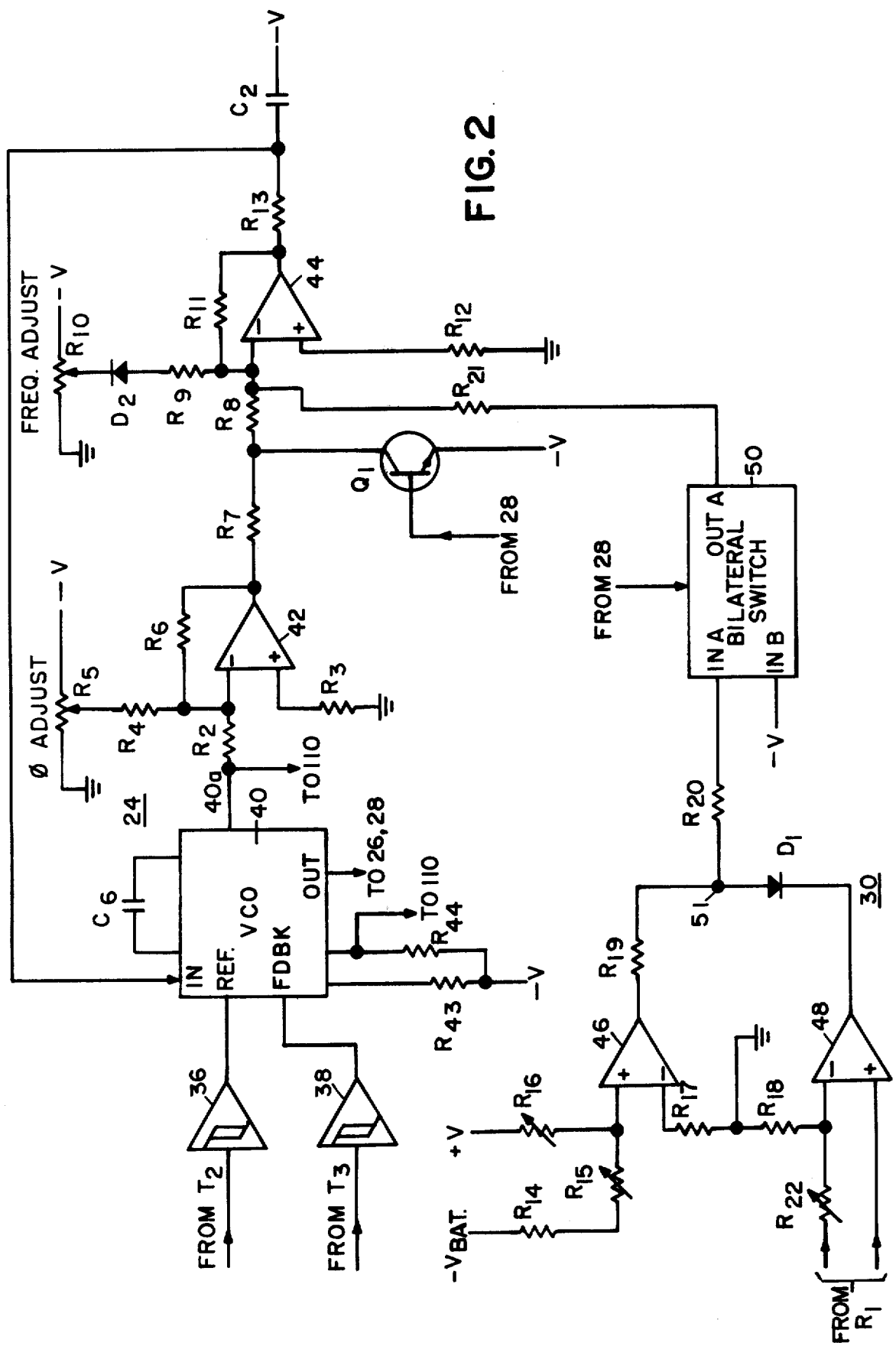
FIG. 2 is a schematic diagram of the phase locked loop and battery charge regulator shown in FIG. 1.
Figure 4:
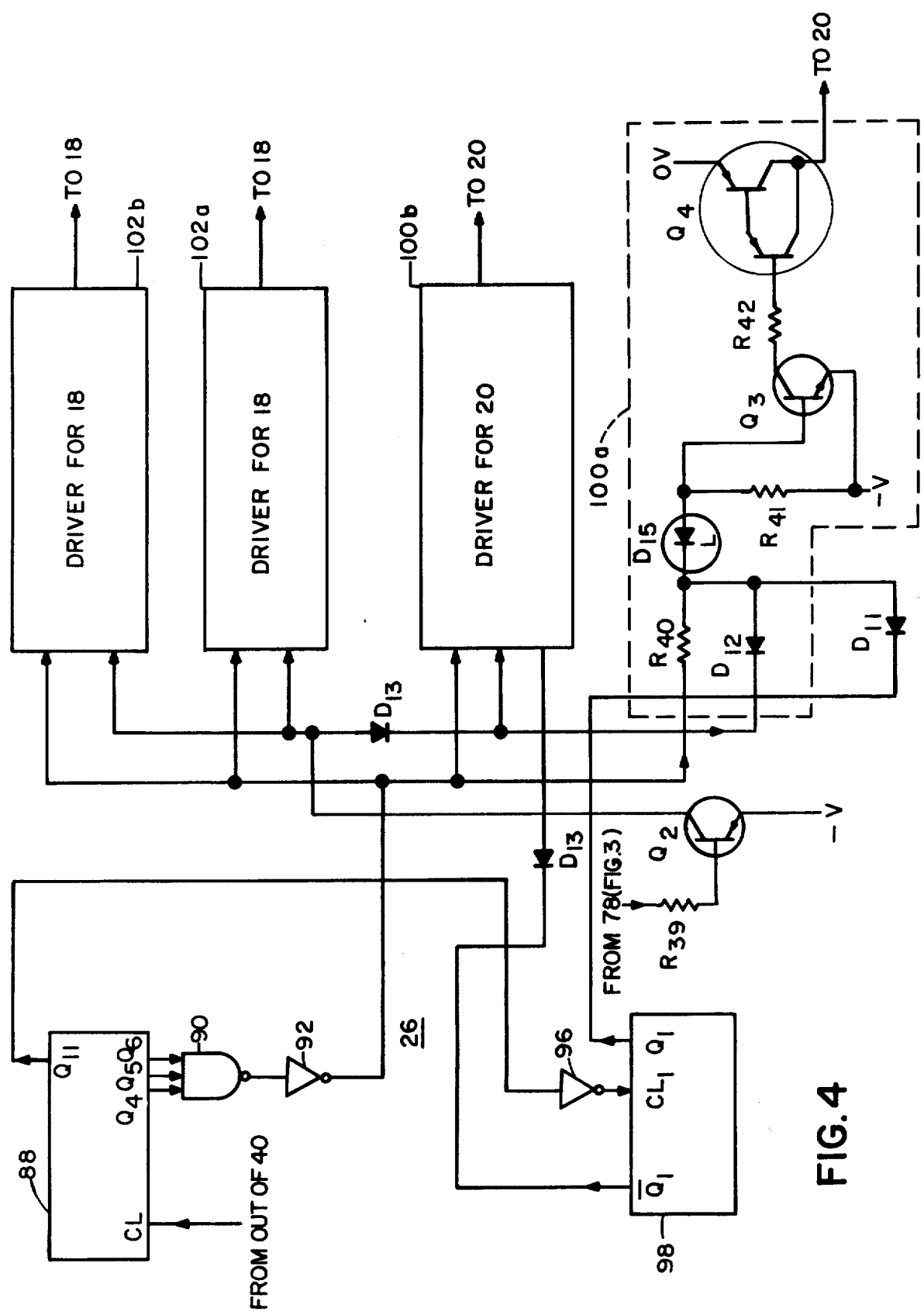
FIG. 4 is a schematic diagram of the pulse generation and driver circuit shown in FIG. 1.

The phase relationship between the voltages is controlled by phase locked loop 24 which receives first and second input signals from transformers $T_2$ and $T_3$, respectively. Transformer $T_2$, having its primary winding connected in parallel with input terminals 14, provides the phase locked loop with a signal derived from the conventional A-C voltage. Transformer $T_3$, having its primary winding in parallel with output terminals 16, provides the phase locked loop with a signal derived from the A-C voltage at the output of regulator 22. Phase locked loop 24 also receives an input from battery charge regulator 30 which is used to control the charging of battery 34 as a function of the battery voltage and charging current. Detailed schematic diagrams for circuits 24 and 30 are shown in FIG. 2 to be described hereinafter. Additionally, the phase locked loop receives an input from A-C sense circuit 28 (described below) which is used to control the loop's output during the failure operating mode of system 10. The output of phase locked loop 24 is connected to pulse generator and driver circuit 26, a detailed circuit schematic for which is shown in FIG. 4 to be described hereinafter, which provides operating signals to static switch 18 and inverter/charger 20.

As described previously, static switch 18 functions as an electronic switch to either apply or remove the conventional A-C power to or from the regulator 22. Switch 18 may, for example, be embodied by two silicon controlled rectifiers (SCR's) connected in inverse parallel configuration. Such an embodiment is shown and described in the '268 patent. Controlling the triggering pulses to the SCR's controls the operation of the switch. Inverter/charger 20 may, for example, be embodied by two SCR's and two diodes with the SCR's being in reverse orientation to the diodes. Such an embodiment is shown and described in the aforementioned '060 patent. Controlling the time of occurrence of the trigger pulses to the SCR's determines whether circuit 20 acts as an inverter or a charger. Generator and driver circuit 26 therefore generates, under the control of phase locked loop 24 and A-C sense circuit 28, the pulses to trigger the SCR's in switch 18 and inverter/charger 20. When system 10 operates in the failure mode, the A-C sense circuit 28 inhibits the generation of trigger pulses to switch 18.

Figure 3:
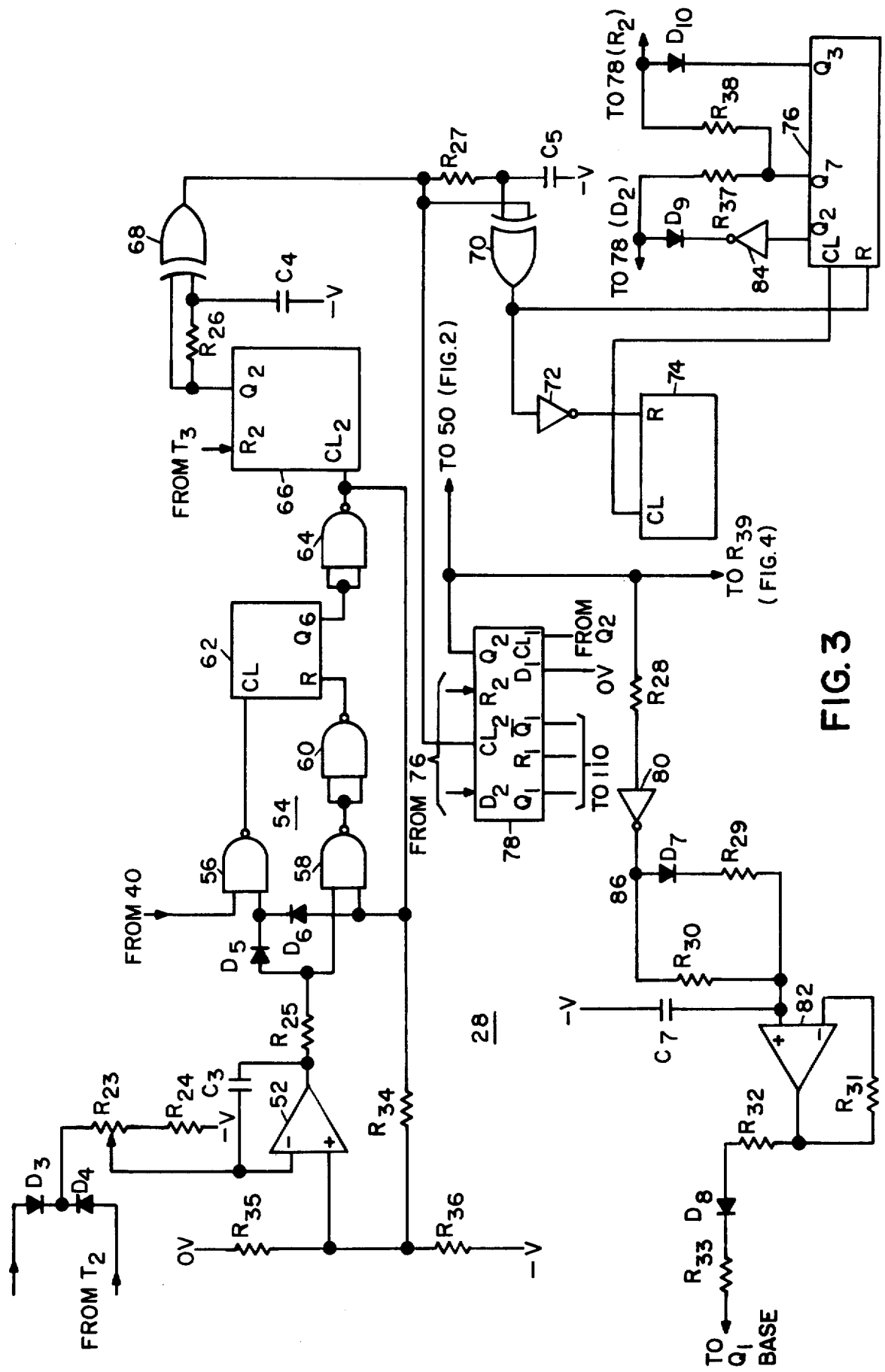
FIG. 3 is a schematic diagram of the A-C sense circuit shown in FIG. 1.

System 10 also includes, as mentioned above, A-C sense circuit 28, a detailed circuit schematic for which is shown in FIG. 3 to be described hereinafter, which also receives from the secondary of transformer $T_2$ a signal derived from the conventional A-C voltage. Circuit 28 functions to determine if the conventional A-C voltage is within acceptable voltage and frequency limits. Sense circuit 28 has one of its three outputs connected to phase locked loop 24. When the conventional A-C voltage falls outside of the acceptable voltage and/or frequency limits, circuit 28 inhibits the operation of phase locked loop 24. Another of circuit 28's outputs is connected to generator and driver circuit 26 to inhibit the generation of trigger pulses to the SCR's of switch 18 when system 10 operates in the failure mode. The operation of static switch 18 is then inhibited to thereby disconnect the conventional A-C voltage from regulator 22. The D-C energy contained in the battery 34 is then used to provide a regulated A-C voltage for the load. The final output of sense circuit 28 is connected to battery charge regulator circuit 30 to inhibit the operation of that circuit when the battery is supplying the load. When the system is functioning in a failure mode, the static switch 18 is open. The conventional A-C voltage is not available to provide current for charging the battery.

Referring to FIG. 2 there is shown a circuit diagram for phase locked loop 24 and battery charge regulator 30. Circuit 24 functions to provide a closed loop which controls the phase relationship between the regulated A-C voltage at terminal 16 and the conventional A-C voltage at terminal 14. Circuit 30 provides an input signal to that closed loop when system 10 is operating in the nonfailure mode. Circuit 24 also functions in an open loop to control the frequency of the A-C voltage generated by inverter 20 from battery 34 upon the failure of the conventional A-C voltage.

Phase locked loop 24 includes voltage controlled oscillator (VCO) 40 which generates at its output (OUT) terminal a square wave of relatively high and variable frequency. It is the combination of the capacitance of capacitor $C_6$ and the resistance of the network comprised of resistors $R_{43}$ and $R_{44}$ which determines the nominal frequency of the square wave generated at the OUT terminal. As will be described in more detail hereinafter, pulse generator and driver circuit 26 uses this square wave to generate the pulses which are used to trigger the SCR's in inverter 20 and static switch 18. When system 10 operates in the failure mode, it is this nominal frequency which determines the rate at which pulses are generated to trigger the SCR's in inverter 20. Therefore, in the failure mode the amplitude of the A-C voltage at the output of inverter 20 is a function of the nominal frequency of the square wave at the OUT terminal of VCO 40. By adjusting the frequency of this high frequency square wave, the regulated A-C output voltage at system output terminal 16 may be made to lag, either by a greater or lesser amount, the conventional A-C voltage at system input terminal 14. The frequency of the square wave is adjusted by having the voltage at the input (IN) terminal of VCO 40 either increase or decrease from its nominal value. Should the frequency of the square wave at the OUT terminal of VCO 40 increase above its nominal value, the phase lag between the regulated A-C voltage and the conventional A-C voltage decreases. If, on the other hand, the frequency of the square wave at the OUT terminal decreases below its nominal value, the phase lag between the A-C voltages increases. When the IN terminal voltage is maintained at its nominal value, the frequency of the square wave is also at its nominal value. This frequency is sufficient to maintain the then current phase angle between the A-C voltages.

As described previously, the voltage at terminal 16 ordinarily lags the voltage at terminal 14 in order that a voltage may appear across inductor $L_1$ to thereby generate the current $I_L$. When the conventional A-C voltage must not only supply the load but also provide current to either recharge or maintain the charge on battery 34, the regulated A-C voltage must further lag the conventional A-C voltage. The amount of this additional phase lag is determined by the signal generated from battery charge regulator 30 to phase locked loop 24. When the battery voltage has increased above a predetermined reference value, a current must flow out of the battery in order that the battery's excess energy be transferred back to the input of system 10. This current flow out of the battery is accomplished by having the regulated A-C voltage lag the conventional A-C voltage by a phase angle which is less than the phase lag needed to supply current to the load. The decrease in phase lag is also determined by the signal generated from battery charge regulator 30 to phase locked loop 24.

In order that VCO 40 may control the phase between the conventional A-C voltage and the regulated A-C output voltage, it is necessary that samples of these two voltages be provided to the VCO. Samples of the voltages are provided to the VCO in the form of square waves. Amplifier 36, having its input connected to receive the conventional A-C voltage from the secondary winding of transformer $T_2$ and its output connected to the REF input terminal of VCO 40, functions to provide at that input a 60 Hz square wave from the conventional A-C voltage. Amplifier 38, having its input connected to receive the regulated A-C voltage from the secondary winding of transformer $T_3$ and its output connected to the FDBK input terminal of VCO 40, functions to provide at that input a 60 Hz square wave from the regulated A-C voltage. Thus, amplifiers 36 and 38 provide to VCO 40 input signals which are representative of the A-C voltages at terminals 14 and 16 of system 10.

In response to the square waves representative of the conventional A-C and regulated A-C voltages, VCO 40 provides at the output terminal designated as 40a in FIG. 2 a square wave signal whose duty cycle is proportional to the phase difference between the two input square waves. This square wave is applied by a resistor $R_2$ to the inverting input of amplifier 42. The inverting input is also connected by a resistor $R_6$ to the amplifier's output and also by resistor $R_4$ to an adjustable resistor $R_5$ to receive a ∅ (phase) adjust signal. The ∅ adjust signal is a D-C bias which represents the amount by which the signal at the IN terminal of VCO 40 must be adjusted in order that, with the operation of static switch 18 inhibited, the conventional A-C voltage be in phase with the regulated A-C voltage when the battery is supplying the load. As will be described in more detail hereinafter, upon restoration of the conventional A-C voltage static switch 18 is closed only after the voltages at terminals 14 and 16 have been brought into phase. Resistor $R_5$ is adjusted in the factory with switch 18 inhibited to insure that this zero phase condition will occur. The noninverting input of amplifier 42 is connected by a resistor $R_3$ to ground.

The output of amplifier 42 is connected by the series combination of resistors $R_7$ and $R_8$ to the inverting input of amplifier 44. A transistor $Q_1$ has a collector connected to the junction of resistors $R_7$ and $R_8$. As will be described in more detail hereinafter, transistor $Q_1$ is nonconducting when system 10 operates in the nonfailure mode. When system 10 operates in the failure mode, transistor $Q_1$ conducts and upon restoral of the conventional A-C voltage $Q_1$ is slowly turned off to allow the regulated A-C voltage generated by inverter 20 from battery 34 to be slowly brought into phase with the conventional A-C voltage before static switch 18 is operated. The base of transistor $Q_1$ is connected to one of the outputs of A-C sense circuit 28.

The inverting input of amplifier 44 is connected to not only receive the output signal from amplifier 42 but is also connected by the series combination of resistor $R_9$ and diode $D_2$ to adjustable resistor $R_{10}$. Resistor $R_{10}$ provides an adjustable D-C bias which represents the frequency of the alternating waveform which will be generated by inverter 20 when system 10 operates in the failure mode. Resistor $R_{10}$ is adjusted such that the inverter generates in the failure mode an alternating waveform whose frequency is substantially equal to the nominal frequency of the conventional A-C voltage. The amplitude of the alternating waveform generated by inverter 20 in the failure mode is, as described previously, determined by the nominal value of the high frequency square wave generated by VCO 40 at its OUT terminal. The inverting input of amplifier 44 also receives by resistor $R_{21}$ a signal from battery charge regulator circuit 30 which is representative of the amount of increase or decrease in the phase lag needed between the conventional A-C voltage and the regulated A-C voltage in order that battery 34 may be either charged from the conventional A-C voltage or return its excess charge to the input of system 10. As will be described in more detail hereinafter, the signal generated by circuit 30 depends on the amount by which the voltage of the battery either falls below or rises above a predetermined reference voltage and, in the case of low battery voltage, is limited by the level of charging current supplied by system 10. Thus, circuit 30 provides a signal which causes the regulated output voltage to lag the conventional A-C voltage by the additional or lesser amount needed to either charge or discharge battery 34, respectively.

Amplifier 44 has its inverting input connected to its output by resistor $R_{11}$ and its noninverting input connected by resistor $R_{12}$ to ground. The output of amplifier 44 is filtered by the series combination of resistor $R_{13}$ and capacitor $C_2$. The midpoint of the series R-C combination is connected to the IN terminal of VCO 40 to thereby close the loop. Thus, the frequency of the square wave generated at the OUT terminal of VCO 40 is proportional to the voltage present at the output of amplifier 44.

As described above, battery charge regulator circuit 30 provides a signal to the inverting input of amplifier 44 which represents the amount of increased or decreased phase lag which must occur between the regulated and conventional A-C voltages in order that either a charging current or discharging current be provided for battery 34. Circuit 30 monitors both the voltage of battery 34 and the level of the charging current. When the battery voltage falls below a predetermined reference voltage, circuit 30 generates a signal of predetermined polarity which causes an increased phase lag between the regulated output voltage and the conventional A-C voltage. The amplitude of the signal is a function of the amount by which the battery phase locked loop 24 increases the phase lag to thereby allow a charging current to be supplied by inverter/charger 20 to battery 34. When the battery voltage rises above the predetermined reference voltage, circuit 30 generates a signal having a polarity opposite to the signal of predetermined polarity described above. This signal, which has an amplitude proportional to the amount by which the battery voltage exceeds the reference voltage, causes a decreased phase lag between the regulated output voltage and the conventional A-C voltage. In response thereto, phase locked loop 24 decreases the phase lag to thereby allow a discharging current to be drawn from battery 34 by inverter/charger 20. The operation of circuit 30 is inhibited by a signal from A-C sense circuit 28 when that circuit detects an undesired line condition.

When system 10 has operated in the failure mode for an extended period of time, the charge on battery 34 may become severely depleted. Upon restoration of the conventional A-C voltage and closing of static switch 18, circuit 30 senses the battery voltage. As the battery voltage is well below the predetermined reference voltage, a relatively large signal will be applied to the IN terminal of VCO 40. The output frequency of VCO 40 will then be adjusted such that the regulated A-C voltage lags the conventional A-C voltage by a large phase angle. In this manner, a relatively large charging current will be applied by inverter/charger 20 to the battery. It is, however, desirable to limit the charging current to some maximum value. Circuit 30 monitors the battery charging current. When that current exceeds a reference representative of maximum desired charging current, the phase lag between the regulated and conventional A-C voltages is adjusted (decreased) to that value which will provide no more than the maximum desired charging current. Thus, circuit 30 provides a signal which allows both additional phase lag between the conventional and regulated A-C voltages and a maximum phase lag therebetween in order that the battery charging current be limited to a predetermined maximum value.

When system 10 decreases the phase lag between the conventional and regulated A-C voltages in order that excess charge on the battery may be removed, circuit 30 does not monitor the discharge current. Increased charge on the battery may arise when the load on system 10 decreases. Prior to the decrease in load, system 10 had adjusted the phase lag between the regulated and conventional A-C voltages in order to supply the current requirements of the load. When the load current requirements decrease, the inductive nature of system 10 prevents an instantaneous decrease in the output current supplied by the system. The excess in current flows into and therefore charges battery 34. Circuit 30 senses the increase of battery voltage above the predetermined reference voltage and generates the signal which causes the phase locked loop to decrease the phase angle between the A-C voltages. Current then flows out of the battery and to the input of system 10. As the voltage in the battery decreases towards the predetermined reference value, the current flowing out of the battery decreases. The phase lag between the A-C voltages increases. When the battery voltage reaches the predetermined reference value, the phase lag is then at that value which is sufficient to supply the current necessary to meet the new load requirements. As the current required by the load is lower than that required prior to the change in load, the phase lag between the regulated and conventional A-C voltages is less than the phase lag which existed prior to the change in load. Once again the small phase lag necessary to provide current for circuit losses and trickle charging the battery has been ignored.

The operation of circuit 30 will not be described in detail. Circuit 30 includes operational amplifiers 46 and 48 which provide output signals representative, respectively of the amount by which the battery voltage and battery charging current vary from predetermined references. The output of amplifier 46 is connected by a resistor $R_{19}$ to a junction designated as 51 in FIG. 2. The output of amplifier 48 is also connected to junction 51 by a diode $D_1$ having its cathode connected to the output of the amplifier and its anode connected to the junction. When the battery voltage is below the reference level and the charging current has not exceeded its maximum allowable value, it is the output signal from amplifier 46 which determines the output signal of circuit 30. When excessive battery charging current is provided by inverter 20, then the output signal of amplifier 48 goes negative which forward biases diode $D_1$ to thereby inhibit the output of amplifier 46. Therefore, in the presence of excessive battery charging current, it is the output signal from amplifier 48 which determines the output signal of circuit 30. When the battery voltage is above the reference level, it is always the output signal from amplifier 46 which determines the output signal of circuit 30.

Amplifier 46 has its noninverting input terminal connected by the series combination of resistor $R_{14}$ and adjustable resistor $R_{15}$ to the negative terminal of battery 34. The noninverting input is also connected by adjustable resistor $R_{16}$ to $+V$ volts. The inverting input of amplifier 46 is connected by resistor $R_{17}$ to ground. Resistors $R_{15}$ and $R_{16}$ provide in combination the predetermined reference voltage level against which amplifier 46 measures the actual voltage of the battery. Resistor $R_{15}$ provides a fine adjustment for the reference voltage level, whereas resistor $R_{16}$ provides a coarse adjustment for that level. When the actual battery voltage falls below or rises above the reference level, amplifier 46 generates a signal whose amplitude depends on the amount by which the actual level falls below or rises above the reference level.

The inverting and noninverting inputs of amplifier 48 are connected to shunt resistor $R_1$ (FIG. 1) which is located in the positive leg of battery 34. The inverting input terminal is also connected by resistor $R_{18}$ to ground. Adjustable resistor $R_{22}$ which connects the inverting input of amplifier 48 to the shunt provides a reference voltage representative of maximum desired battery charging current. This voltage determines a threshold for the change in state of the output of amplifier 48. When the actual charging current exceeds the threshold, the output of amplifier 48 changes state and diode $D_1$ is caused to conduct. The conduction of diode $D_1$ inhibits the conduction of amplifier 46, and the phase locked loop 24 responds to the signal from amplifier 48 to adjust the phase angle and provide the maximum charging current. The battery is therefore charged at the maximum current.

As the battery charges at the maximum current, its voltage increases. The battery characteristics are such that as the voltage increases, the charging current decreases below the maximum rate. When this occurs, amplifier 48 changes state and diode $D_1$ becomes reverse biased. Amplifier 46 is no longer inhibited, and the voltage on the battery is allowed to control the phase angle between the A-C voltages.

The junction 51 is connected by a resistor $R_{20}$ to the A input (IN A) of bilateral switch 50. The B input (IN B) of the switch is connected to a voltage, $-V$. The A output (OUT A) of the switch is connected by resistor $R_{21}$ to the inverting input of amplifier 44. Bilateral switch 50 also receives an input signal from A-C sense circuit 28. When an undesirable line condition occurs, circuit 28 inhibits the operation of switch 50 to thereby disconnect battery charge regulator circuit 30 from phase locked loop 24. The reason for this disconnection is that the occurrence of an undesired line condition inhibits the operation of switch 18 to thereby disconnect the conventional A-C voltage from the regulator circuit 22. The battery then supplies the load, and the voltage of the battery starts to decrease. If circuit 30 were left connected to phase locked loop 24, it would sense the decrease in battery voltage and attempt to cause the phase locked loop to adjust the phase angle to charge the battery. With the operation of switch 18 inhibited, there is no conventional A-C voltage available for that purpose.

The manner in which phase locked loop 24 and battery charge regulator circuit 30 operate to control the phase angle between the A-C voltages will now be descirbed. VCO 40 responds to the voltage at its IN terminal to adjust the frequency of the square wave at its OUT terminal. When the voltage is maintained at its nominal value, the frequency of the square wave frequency is maintained at its nominal value and the phase angle between the voltages is maintained at its then present value. Adjustment of the square wave frequency is obtained by adjusting the input voltage either above or below its nominal value. By changing the frequency of the square wave the time of occurrence of the trigger pulses for the SCR's in the inverter may be adjusted to thereby change the phase angle between the A-C voltages.

As an example, consider that system 10 is operating under no load conditions with battery 34 fully charged, the conventional A-C power in a nonfailure condition and switch 18 closed. Except for the small amount of current which is needed to compensate for the losses in ferroresonant transformer $T_1$ and trickle charge the battery, the regulated output voltage and the conventional A-C voltage will be substantially in phase. Ignoring the losses in transformer $T_1$ and the trickle charge current, there will be no voltage across line inductor $L_1$. Assume a load is now connected to terminal 16. With no voltage across line inductor $L_1$ and due to the inductive nature of system 10, the current for the load will initially be supplied by the battery 34 through inverter 20. The charge in the battery therefore decreases and circuit 30 senses this decrease. When the battery voltage falls below the predetermined reference, a signal from circuit 30 adjusts the voltage at the IN terminal of VCO 40 to thereby change the frequency of the square wave at the VCO's OUT terminal.

As will be described in more detail in connection with FIG. 4, the change in the frequency of the square wave adjusts the time of occurrence of triggering pulses to the SCR's of the inverter to thereby allow the regulated output voltage to lag the conventional A-C voltage. A voltage then appears across line inductor $L_1$ which in turn provides a current $I_{L1}$. As the phase lag increases, system 10 reaches a phase lag which is sufficient to provide enough current to meet the load requirements. The battery must still be recharged, and circuit 30 causes the phase lag to be further increased to thereby provide a battery recharging current as well as a load current.

As the battery recharges, its voltage increases and the output signal from amplifier 46 decreases in amplitude. In response to this decreasing signal amplitude from circuit 30, the VCO adjusts the frequency of the square wave at its OUT terminal to provide a decreasing phase difference (lag) between the conventional A-C voltage and the regulated A-C voltage. This smaller phase difference decreases the charging current to the battery. The phase difference decreases towards that angle of lag at which the conventional A-C voltage will no longer provide battery recharging current. When the voltage on the battery reaches the reference level, the output signal of circuit 30 decreases to zero. The battery is now fully recharged. The signal at the IN terminal of VCO 40 returns to the nominal value. The conventional A-C voltage is now required to supply current only for the external load. The phase difference is now at that angle of lag to provide only the load current. With the signal at its IN terminal at the nominal value, the VCO now maintains that phase difference. The phase locked loop 24, battery 34 and circuit 30 function in an identical manner to provide the additional load current required if the load should be increased from its then value.

In a phase locked loop and battery charge regulator circuit constructed in accordance with the present invention, VCO 40 and bilateral switch 50 were embodied by chip types CD 4046 and CD 4066, respectively. Capacitor $C_6$ and resistors $R_{43}$ and $R_{44}$ determine the nominal frequency of the square wave generated at the OUT terminal of VCO 40 and are connected to the VCO in the conventional and well known manner in the art for connecting frequency determining elements to the CD 4046 chip type. These chips are currently available from any one of a number of integrated circuit manufacturers such as National Semiconductor Corp. of Santa Clara, California.

Referring to FIG. 3 there is shown a schematic circuit diagram for A-C sense circuit 28. When the conventional A-C voltage falls outside of the acceptable voltage limit and/or frequency limits, circuit 28 inhibits the operation of phase locked loop 24 by turning on transistor $Q_1$ (FIG. 2). When transistor $Q_1$ is turned on, the voltage at the output 40a of VCO 40, which represents the phase difference between the conventional A-C voltage and the regulated A-C voltage, is shunted to ground. This shunting to ground of the voltage opens the closed loop system which controls the phase relationship between the A-C voltages. As will be described hereinafter, static switch 18 is then inhibited to thereby disconnect the conventional A-C voltage from regulator 22. The battery is then used to supply by inverter 20 the A-C voltage to the load. The frequency of that voltage is determined by the setting of adjustable resistor $R_{10}$ (FIG. 2).

Circuit 28 monitors the conventional A-C voltage to determine when that voltage once again falls within acceptable voltage and frequency limits. Transistor $Q_1$ is kept conducting as long as the amplitude of the conventional A-C voltage is below the acceptable lower limit. This is so even if the voltage is within the acceptable frequency limits. Once circuit 28 detects that the voltage amplitude has increased above the acceptable lower limit, the circuit then determines if the voltage falls within the acceptable frequency limits. When the voltage falls both within the acceptable amplitude and frequency limits, circuit 28 effects a slow turnoff of transistor $Q_1$ to thereby allow the phase locked loop 24 to once again control the phase relationship between the A-C voltages.

A slow turnoff of transistor $Q_1$ is desirable in that it allows phase locked loop 24 to gradually assume control of the phase relationship between the A-C voltages. The rapid turning off of $Q_1$ would cause phase locked loop 24 to attempt a rapid adjustment of the phase between the A-C voltages. The phase locked loop, as described previously, accomplishes a rapid phase adjustment by a rapid change in its output frequency. The characteristics of ferroresonant transformer $T_1$ (FIG. 1)

are such that a rapid change in frequency would produce undesirably large spikes in the regulated voltage at output terminal 16. By slowly turning off transistor $Q_1$, these undesirable spikes are avoided.

The operation of circuit 28 will now be described in detail. The series combination of oppositely poled diodes $D_3$ and $D_4$ function to full wave rectify the conventional A-C voltage which appears across the secondary of transformer $T_2$. The rectified voltage appearing at the center point of the series combination is connected by the combination of adjustable resistor $R_{23}$ and resistor $R_{24}$ to the inverting input terminal of amplifier 52. Resistors $R_{23}$ and $R_{24}$ function to attenuate the full wave rectified voltage with adjustable resistor $R_{23}$ determining the acceptable lower limit of the conventional A-C voltage. The noninverting input of amplifier 52 is connected to the center point of the series combination of resistors $R_{35}$ and $R_{36}$, with $R_{35}$ being connected to zero volts and $R_{36}$ being connected to $-V$ volts.

The voltage at the amplifier's noninverting input is a function not only of resistors $R_{35}$ and $R_{36}$, but also of a resistor $R_{34}$ which is connected to the junction of $R_{35}$ and $R_{36}$ and to one of the inputs and the output of a digital filter 54. The output of amplifier 52 is connected by a resistor $R_{25}$ to provide another input signal to filter 54. The filter also receives as an input signal the square wave of relatively high and variable frequency from the OUT terminal of VCO 40.

Amplifier 52 compares the voltages at its input terminals and when the attenuated full wave rectified signal at its inverting input terminal becomes greater in amplitude then the voltage at the noninverting terminal, the output of the amplifier goes low. The going low of the output of amplifier 52 should be an indication that the conventional A-C voltage is greater in amplitude than the acceptable lower limit. It is desired to use this indication to enable circuitry included in A-C sense circuit 28 which determines if the frequency of the voltage is within the acceptable limits. Noise or transients in the voltage may, however, cause that voltage to momentarily rise above the acceptable lower limit. If sense circuit 28 were to respond to such noise or transients, a false indication that the conventional voltage is within acceptable voltage and frequency limits might be given to system 10. Filter 54, whose operation is to be described below, ensures that such noise or transients have no effect on the operation of system 10.

Filter 54 includes NAND gates 56, 58, 60 and 64, a counter 62 and diodes $D_5$ and $D_6$. The $Q_6$ output of counter 62 is connected to both input of gate 64. With the counter reset, the output of gate 64 is at a high level. The output of gate 64 is connected directly to one input of two input gate 58, by the diode $D_6$ (poled as shown) to one input of two input gate 56 and by the resistor $R_{34}$ to the junction of resistors $R_{35}$ and $R_{36}$. When the attenuated full wave rectified voltage at amplifier 52's inverting input is less than the voltage at the amplifier's noninverting input, the output of the amplifier is high. The amplifier's output is connected directly by the resistor $R_{25}$ to the other input to gate 58 and by a diode $D_5$ (poled as shown) to the same input of gate 56 to which the diode $D_6$ is connected. Diodes $D_5$ and $D_6$ function as an OR gate.

With the output of amplifier 52 and/or gate 64 high, gate 56 is enabled. The other input of gate 56 receives the square wave from the OUT terminal of VCO 40. With gate 56 enabled, this square wave signal is applied to the clock (CL) input of counter 26. The counter does not, however, respond to this signal. With the output of amplifier 52 a high, the output of gate 58 is a low. As both inputs of two input gate 60 are connected to the output of gate 58, the output of gate 60 is a high. As the output of gate 60 is connected directly to the reset (R) input of counter 62, the high holds the counter reset. Thus, as long as the output of amplifier 52 remains high, counter 62 is held reset.

When the output of amplifier 52 goes low, the high on the reset of counter 62 is removed. As the $Q_6$ output of the counter is still low, gate 64 by diode $D_6$ still provides a high on the input of gate 56 connected thereto. The square wave from the VCO OUT terminal is then allowed to clock the counter. When the counter has counted $2^5$ of these high frequency pulses, its $Q_6$ output terminal is driven high. The output of gate 64 then goes low and as the output of amplifier 52 is also low, gate 56 is inhibited and counting stops. If the going low of the output of amplifier 52 was due to noise or a transient whose duration was less than the time it takes counter 62 to count from zero to $2^5$, then upon the disappearance of the noise or transient the output of amplifier 52 would go high, counter 62 would be reset and the $Q_6$ output would not go high.

When the $Q_6$ output goes high, the low at the output of gate 64 appears by resistor $R_{34}$ at the noninverting input terminal of amplifier 52, pulling that terminal lower than it was before. As the amplitude of the half cycle of the attenuated full wave rectified voltage decreases, the voltage at the amplifier's minus input terminal will eventually fall below the voltage at the amplifier's plus input terminal. When this occurs, the output of amplifier 52 once again goes high. It should be appreciated that for each half cycle of the rectified voltage, the amplifier output initially changes from a high to low at a voltage which is greater than the voltage at which it next changes back to a high from a low. This difference in amplifier switching level occurs because of the connection of the output of gate 64 to the junction of resistors $R_{35}$ and $R_{36}$. The difference in switching level provides a hysteresis effect.

With its $Q_6$ output high and the output of amplifier 52 a low, counter 62 will neither count nor be reset. When the output of amplifier 52 next goes high, as described above, gate 56 is enabled by diode $D_5$ and the counter starts to count. After $2^5$ additional clock signals, the $Q_6$ output goes low and the output of gate 64 goes high. As described previously with the outputs of gate 64 and amplifier 52 both high, a high appears at the reset input to counter 62 thereby resetting the counter. The counter is held reset until such time as the output of amplifier 52 next goes low.

The pulses at the OUT terminal of VCO 40 have a nominal frequency of $25 \times 10^4$ Hz as determined by the resistance selected for resistors $R_{43}$ and $R_{44}$ and the capacitance selected for capacitor $C_6$. As counter 62 counts $2^5$ of these pulses, filter 54 filters out transients or noise with durations less than or equal to approximately 130 microseconds. With the $Q_6$ output of the counter a high, the counter will be reset approximately 130 microseconds after the output of amplifier 52 next goes high. This is more than sufficient time to be ready for the next cycle of the conventional voltage as that voltage has a frequency which is nominally 60 Hz.

The output of gate 64 is also connected, as described above, to the $CL_2$ input of flip-flop 66. When the output of gate 64 goes low, the flip-flop is clocked to thereby generate at its $Q_2$ output terminal a square wave having a 50% duty cycle. This square wave is fed directly to one input of two input exclusive OR gate 68 and to the other input of the gate by the delay network comprising the combination of resistor $R_{26}$ and capacitor $C_4$. Gate 68 therefore produces at its output a narrow width pulse which will hereinafter be referred to as the A-C line timing signal.

In order to determine if the frequency of the conventional A-C voltage falls within acceptable limits, circuit 28 counts pulses which are generated by a timer 74. Upon the occurrence of the A-C line timing signal, the count is placed into a latch 78. Latch 78 is embodied herein by an integrated circuit chip which incorporates dual flip-flops of the D type, one of the flip-flops being used in connection with circuit 28 and the other of the flip-flops being used in connection with circuit 110. The polarity of the signal at the output terminal of the latch is then used in determining whether or not the frequency is within the acceptable limits. It should be appreciated that the A-C line timing signal is generated only when the conventional A-C voltage has an amplitude greater than the acceptable lower limit. Thus, the generation of the A-C line timing signal indicates a voltage of acceptable amplitude and is also used in determining if the frequency of that voltage is within acceptable limits. The determination of whether or not the frequency is within acceptable limits will now be described.

The A-C line timing signal is connected to the clock ($CL_2$) input of flip-flop 78 to latch therein any data present at the flip-flop's $D_2$ input terminal. The $D_2$ terminal of circuit 78 is connected by the series combination of diode $D_9$ (poled as shown) and inverter 84 to the $Q_2$ output terminal of ripple carry counter 76 and by resistor $R_{37}$ to the $Q_7$ output terminal of the counter. The $Q_7$ terminal of the counter is connected by resistor $R_{38}$ to the reset ($R_2$) terminal of flip-flop 78. The reset terminal is also connected by a diode $D_{10}$ (poled as shown) to the $Q_3$ output terminal of counter 76. In order that flip-flop 78 indicate the frequency is within acceptable limits, it is necessary for the $Q_2$ output of the flip-flop to be a "1". If this output is a "0", then this is an indication that the frequency and/or voltage is not within acceptable limits. As will be described hereinafter, a "1" at the $Q_2$ output allows for a slow turnoff of transistor $Q_1$, whereas a "0" at that terminal maintains the transistor conductive. As described in connection with FIG. 2, the $Q_2$ output is connected to bilateral switch 50 and a "0" at that output disconnects the battery charge regulator cirucit 30 from the phase locked loop 24. A "1" at that output allows circuit 30 to be reconnected to the phase locked loop. As will be described in more detail hereinafter in connection with FIG. 4, a "1" at the $Q_2$ output enables static switch 18 to connect the conventional A-C voltage to regulator circuit 22, whereas a "0" at the $Q_2$ output inhibits the switch and results in the disconnection of such A-C voltage from the regulator.

For the $Q_2$ output of the flip-flop to be a "1", it is necessary that both the $Q_2$ output of counter 76 be a "0" (low) and the $Q_7$ output of the counter to be a "1" (high) at the time of occurrence of the A-C line timing signal. This combination ensures that the data at the $D_2$ input of flip-flop 78 at that time will be such as to cause the $Q_2$ output of the flip-flop to be a "1". If the $Q_2$ and $Q_7$ outputs of the counter 76 are other than as described above, a "0" will be latched into the flip-flop's $Q_2$ output when the occurrence of the A-C line timing signal.

Counter 76 counts pulses which are generated by timer circuit 74. In order that counter 76 may count these pulses, the clock (CL) output of timer 74 is connected to the clock ($CL_2$) input of counter 76. A delayed version of the A-C line timing signal is used to reset both timer 74 and counter 76. The delayed version of the timing signal is generated by connecting the output of gate 68 to the delay circuit comprised of the series combination of resistor $R_{27}$ and capacitor $C_5$. The midpoint of that combination is connected to an exclusive OR gate 70 whose output is connected directly to the reset (R) input of counter 76 and by inverter 72 to the reset (R) input of timer 74. The delay provided by resistor $R_{27}$ and capacitor $C_5$ is sufficient to allow the delayed version of the line timing signal to reset timer 74 and counter 76 only after the data in counter 76 has been latched into flip-flop 78 by the line timing signal.

As described above, when the system operates in a failure mode, the transistor $Q_1$ is fully conductive. The occurrence of an undesired line condition is indicated by the $Q_2$ output of flip-flop 78 being "0". The $Q_2$ output is connected by the series combination of resistor $R_{28}$ and inverter 80 to junction point 86. The noninverting input of amplifier 82 is connected to junction point 86 by the network consisting of resistor $R_{30}$ in parallel with the series combination of diode $D_7$ (poled as shown) and resistor $R_{29}$. The noninverting input of amplifier 82 is also connected by a capacitor $C_7$ to a source of negative voltage, $-V$. The output of amplifier 82 is connected by the series combination of resistor $R_{32}$, diode $D_8$ (poled as shown) and resistor $R_{33}$ to the base of transistor $Q_1$.

When the $Q_2$ output of flip-flop 78 becomes a "0", the output of inverter 80 goes high. Capacitor $C_7$ is allowed to charge to thereby maintain the high level at the noninverting input of amplifier 82. The output of amplifier 82 also goes high, thereby turning on transistor $Q_1$ and shunting the signal at terminal 40a of VCO 40 to ground. When the conventional A-C voltage recovers in both amplitude and frequency, the $Q_2$ output of flip-flop 78 becomes a "1". The output of inverter 80 now goes low and capacitor $C_7$ is allowed to discharge through resistor $R_{30}$. The discharging of the capacitor causes the voltage at the noninverting input terminal and therefore at the output of amplifier 82 to decrease from its previously high level. In turn, the voltage on the base of transistor $Q_1$ decreases thereby effecting a controlled turnoff of the transistor. It should be appreciated that by selecting the component values for capacitor $C_7$ and resistor $R_{30}$, the rate of discharge of the capacitor and therefore the rate at which transistor $Q_1$ is turned off may be regulated.

As described above, upon the restoration of the A-C voltage, transistor $Q_1$ is slowly turned off to allow the phase locked loop 24 to control the phase relationship between the A-C voltages. When system 10 was operating in the failure mode, the static switch 18 was inhibited to block the application on the conventional A-C voltage to the regulator circuit 22. Upon the restoration of the input A-C voltage and the turning off of transistor $Q_1$, the static switch should once again be enabled to allow the input A-C voltage to be connected to the regulator. It may, however, be desirable to provide a delay before the reactivation of the static switch is accomplished. A delay will ensure that the restoration of the conventional A-C voltage was not of a temporary nature. A suitably long delay may be obtained by a circuit which, upon the change of the $Q_2$ output of flip-flop 78 to a "1", counts a predetermined number of pulses from the A-C voltage. For example, the circuit may be designed to count $2^{11}$ of these pulses which therefore provides a delay of approximately 34 seconds before the static switch is enabled.

Referring to FIG. 4 there is shown a schematic circuit diagram for the pulse generator and driver circuit 26 of FIG. 1. Circuit 26 generates the firing pulses which are used to drive the SCR's comprising both static switch 18 and inverter/charger 20. These pulses are generated by circuit 26 from the high and variable frequency square wave available at the OUT terminal of VCO 40. The manner in which circuit 26 generates these pulses will now be described.

Circuit 26 includes 14 stage ripple carry counter 88 whose clock (CL) input is connected to receive the high frequency square wave at the OUT terminal of VCO 40. Two signals are obtained from counter 88 and the other signal is obtained from the counter's $Q_{11}$ output. The $Q_4$, $Q_5$ and $Q_6$ outputs are connected to the inputs of three input NAND gate 90 whose output is connected to inverter 92. The $Q_4$, $Q_5$ and $Q_6$ outputs of counter 88 are each square waves of 50% duty cycle and have frequencies which are related to each other by a factor of two. Therefore, the signal at the output of inverter 92 is a continuous pulse train whose duty cycle is 12.5% and whose frequency is related to the frequency of the signal at the VCO OUT terminal by a factor of $2^6$. As the frequency of the signal at the VCO OUT terminal is nominally $25 \times 20^4$ Hz, the base frequency of the signal at the output of inverter 92 is, therefore, nominally 3.8 KHz. This low frequency continuous pulse train is applied to the base of the transistor which is used to drive the SCR's in circuits 18 and 20.

Associated with each SCR is a driver circuit. Static switch 18 and inverter 20 each comprise two SCR's. System 10 therefore includes four such driver circuits with the two driver circuits for the SCR's of inverter 20 being designated as 100a and 100b in FIG. 4 and the two driver circuits for the SCR's of switch 18 being designated as 102a and 102b in FIG. 4. Each of these circuits are identical in structure and function and, therefore, a schematic diagram is shown in FIG. 4 for only one of the circuits (100a associated with an SCR of inverter 20).

The square wave at the output of inverter 92 is connected by the series combination of a resistor $R_{40}$ and a zener diode $D_{15}$ (poled as shown) to the base of a transistor $Q_3$. Transistor $Q_3$ has its collector connected by resistor $R_{42}$ to the Darlington transistor network designated as $Q_4$ in FIG. 4.

The other signal from counter 88 is obtained from its $Q_{11}$ output. This signal is a 50% duty cycle square wave whose frequency is related to the frequency of the square wave at the VCO OUT terminal by a factor of $2^{11}$. As the frequency of the VCO OUT terminal square wave is nominally $25 \times 10^4$ Hz, the frequency of the square wave at the $Q_{11}$ output of counter 88 is nominally 120 Hz. This square wave is applied by inverter 96 to the $CL_1$ input of dual D type flip-flop 98. The $Q_1$ and $\overline{Q}_1$ outputs of the flip-flop are therefore 60 Hz square waves which are 180 degrees out of phase with respect to each other. The $Q_1$ output of flip-flop 98 is connected by a diode $D_{11}$ (poled as shown) to the cathode of zener diode $D_{15}$. The $\overline{Q}_1$ output of flip-flop 98 is connected by diode $D_{13}$ (poled as shown) to the cathode of the equivalent zener diode (not shown) located in driver circuit 100b.

The square waves present at the $Q_1$ and $\overline{Q}_1$ terminals are used in conjunction with diodes $D_{11}$ and $D_{13}$, respectively, as current sinks for their associated driver transistors. When the signal at $Q_1$ is low, the anode of diode $D_{11}$ is held at approximately $+0.7$ volts thereby preventing the turnon of zener diode $D_{15}$ even with pulses present at resistor $R_{40}$. When the signal at the $Q_1$ output goes high, the voltage present at resistor $R_{40}$ biases diode $D_{15}$ on to thereby allow the signal at the output of inverter 92 to turn on transistor $Q_3$. In this manner, there is generated at the output of transistor $Q_4$ groups of 3.8 KHz pulses which have been interrupted at a 60 Hz rate. These groups of comb pulses are used to drive one of the two SCR's included in inverter 20. Similar groups of pulses are generated at the output of driver circuit 100b with the exception that these pulses are 180 degrees out of phase with respect to the pulses generated at the output of driver circuit 100a. These groups of comb pulses are used to drive the other of the two SCR's included in inverter 20. This phase difference is provided by the 180 degree phase relationship between the $Q_1$ and $\overline{Q}_1$ outputs of flip-flop 98.

In a manner similar to that described above, drivers 102a and 102b generate from the output of inverter 92 the pulses used to drive the SCR's comprising static switch 18. The only difference between the pulses generated by drivers 102a and 102b and those generated by drivers 100a and 100b is that the 102a/102b generated pulses are not interrupted at the 60 Hz rate as are the 100a/100b generated pulses. As shown in FIG. 4, the $Q_1$ and $\overline{Q}_1$ outputs of flip-flop 98 are connected only to drivers 100a and 100b, respectively, and not to drivers 102a and 102b. Thus, the 60 Hz square waves generated at the outputs of flip-flop 98 are not applied to drivers 102a and 102b.

As described previously for FIG. 3, when the conventional A-C voltage is not within the predetermined voltage and/or frequency limits, the $Q_2$ output of flip-flop 78 is a "0". This zero is connected through a resistor $R_{39}$ to the base of a transistor $Q_2$ whose emitter is connected to $-V$ volts and whose collector is connected to one of the two inputs comprising drivers 102a and 102b. When the base of $Q_2$ goes low, the transistor conducts to thereby prevent the generation of firing pulses to the SCR's comprising the static switch. The operation of the switch is then inhibited and the conventional A-C voltage is no longer connected to the regulator 22. Diode $D_{14}$ (poled as shown) is connected between the collector of transistor $Q_2$, one input of driver 102a and one input of driver 102b and provides isolation between the two sets of drivers so that the conduction of transistor $Q_2$ has no effect on drivers 100a and 100b.

As described previously, when the conventional A-C voltage once again falls within the voltage and frequency limits, the $Q_2$ output of flip-flop 78 becomes a "1". This high level causes transistor $Q_2$ to become nonconductive, and drivers 102a and 102b are once again enabled to provide the firing pulses for the SCR's in switch 18. If desired, a suitably arranged delay network may be interposed between the $Q_2$ output of flip-flop 78 and resistor $R_{39}$. By making this network responsive only to the transition of $Q_2$ from a "0" to a "1", the delay described previously to the enabling of the static switch upon restoration of the conventional A-C voltage may be provided.

Referring to FIG. 5 there is shown a schematic circuit diagram for transfer compensation circuit 110 of FIG. 1. Circuit 110 compensates for the transient in the system output voltage which occurs when system 10 switches from the normal to the failure mode of operation. When one or more of the predetermined conditions described previously occur, system 10 switches the regulated A-C voltage at its output from the conventional A-C voltage to the A-C voltage provided by inverter 30 from battery 34. Prior to switching its output voltage, the system operates in the normal mode and the inverter-battery combination operates in a standby and, therefore, nonload sharing capacity. At the instant that the system switches from the normal to the failure mode the inverter is loaded and the output voltage of the system decreases momentarily from the regulated value to some lower value. This momentary decrease in system output voltage lasts for a time duration which is dependent on total system load but is typically in the order of about 25 m.sec. This momentary decrease in system output voltage, while short in duration, does, however, give rise to a transient in the output voltage which may have a detrimental effect upon the operation of the external load.

The amount by which the output voltage decreases when system 10 switches or transfers from the normal to the failure mode is dependent on the total load being handled by the system at that instant of time. The total load includes not only the external load but also battery 34. In its normal mode of operation system 10 generates, in addition to current for the external load, a current for purposes of either trickle charging or recharging the battery. The total load on the system at the instant of switching may be quite heavy if at the instant system 10 was also providing a current to recharge a depleted battery 34. As the duration of the transient is dependent on the total load on the system at the moment of transfer, the compensation provided by circuit 110 is also dependent upon the total system load at that instant.

As will be described in more detail below, circuit 110 compensates for the switching transient by increasing for a time dependent upon the total load on the system just prior to transfer the frequency of the pulses generated by VCO 40 at its OUT terminal. As described previously in connection with FIG. 4, it is these pulses which are used to generate the firing signals for the SCR's comprising inverter 20. As described previously in connection with FIG. 2, it is the nominal value of this frequency which determines the amplitude of the A-C voltage generated by inverter 20 from battery 34 in the failure mode. By increasing this frequency for a time duration related to total system load, the firing rate of the SCR's and, therefore, the A-C voltage generated by inverter 20 from battery 34 are both increased. Circuit 110 accomplishes this function by measuring the average voltage at the output terminal 40a of VCO 40. As described in connection with FIG. 2, the voltage at terminal 40a is a square wave signal whose duty cycle is proportional to the phase difference between the conventional A-C voltage and the regulated A-C output voltage of system 10. It is this phase difference which allows the conventional A-C voltage to provide current both for the external load and for either trickle charging or recharging the battery 34. Thus, the average voltage at terminal 40a is related to and may, therefore, be used as a measure of the total load to which system 10 is providing power in the normal mode.

Upon the switching of system 10 from the normal mode of operation to the failure mode, circuit 110 lowers by a fixed amount the total resistance of the resistive part of the frequency determining R-C circuit elements ($R_{43}$, $R_{44}$; $C_6$) connected to VCO 40 to thereby increase the frequency of the square wave generated by the VCO at its OUT terminal. As will be described in more detail below, this change in resistance and, therefore, output frequency of the OUT terminal square wave is controlled as a function of total load. Therefore, the amount of time during which the SCR's of inverter 20 are fired at a faster rate is dependent solely upon the total load seen by system 10 at the instant of transfer. Thus, if the load at that instant is relatively light, the transient developed at the output of system 10 in the absence of compensation would be relatively short in duration and circuit 110 therefore introduces compensation of relatively short duration. On the other hand, if the load at the instant is relatively heavy, the transient developed at the output of the system in the absence of compensation would be relatively long in duration and circuit 110 therefore introduces compensation of relatively long duration.

The operation of circuit 110 will now be described in detail. Output terminal 40a of VCO 40 is connected by resistor $R_{45}$ to the inverting input of operational amplifier 112. The inverting input is also connected to the voltage $-2$ V by a resistor $R_{46}$ and by the parallel combination of resistor $R_{48}$ and capacitor $C_7$ to the amplifier's output. The amplifier's noninverting input is connected by a resistor $R_{47}$ to ground. Amplifier 112 therefore functions as an integrating phase lag type network to generate at its output a D-C level proportional to the phase difference signal present at terminal 40a.

The output of amplifier 112 is connected by the series combination of resistor $R_{49}$ and diode $D_{15}$ (poled as shown) to a junction 114. A capacitor $C_8$ is connected between junction 114 and ground. When system 10 operates in the normal mode, the capacitor $C_8$ is charged to the D-C level at the output of amplifier 112. The voltage on the capacitor when system 10 operates in the normal mode is, therefore, a direct indication and measure of the total system load.

Junction 114 is also connected by a resistor $R_{50}$ to the $Q_1$ output of the other D type flip-flop included in circuit 78. As described previously in connection with FIG. 3, circuit 78 includes two D type flip-flops, one of which indicates the occurrence of an undesired line condition in system 10. When such a condition occurs, the system transfers to the failure mode and the $Q_2$ output of circuit 78 becomes a "1". When system 10 operates in the normal mode, the $Q_2$ output is a "0". The $Q_2$ output is connected to the clock input ($CL_1$) of the other flip-flop comprising circuit 78. When system 10 operates in the normal mode, the $Q_1$ output of circuit 78 is a "0" and no current flows through resistor $R_{50}$. Junction 114 is also connected by a zener diode $D_{16}$ (poled as shown) to the base of a transistor $Q_5$. The diode $D_{16}$ is chosen to have a conduction voltage which is greater than the maximum voltage which may appear across capacitor $C_8$ when system 10 operates in the normal mode. This maximum normal mode capacitor voltage occurs when the total load on system 10 is minimal. Thus, in the normal mode of operation for system 10 the voltage across capacitor $C_8$ is representative of the total system load.

Upon the occurrence of an undesired line condition in system 10, the $Q_2$ output of circuit 78 changes from a "0" to a "1". This change appears at the $CL_1$ input of the other flip-flop comprising circuit 78. The D input of that flip-flop is connected to OV and upon the change of level at the clock input, the flip-flop sets causing its $Q_1$ output to become a "1". With the $Q_1$ output now a "1" the capacitor $C_8$ is allowed to charge from the current flowing in the resistor $R_{50}$. The voltage on the capacitor therefore increases until it reaches the value necessary to cause zener diode $D_{16}$ to conduct. The time it takes for the capacitor to charge to that value of voltage is dependent on the voltage initially on the capacitor when system 10 underwent a transfer. As the initial voltage on the capacitor is representative of total system load, the time it takes the capacitor to charge to the diode's conduction voltage is, therefore, dependent on total system load.

Simultaneously with the $Q_1$ output of circuit 78 becoming a "1", the $\overline{Q}_1$ output of that circuit becomes a "0". The $\overline{Q}_1$ output is connected by the series combination of resistor $R_{53}$ and diode $D_{17}$ (poled as shown) to the network consisting of the parallel combination of resistors $R_{43}$ and $R_{44}$. It is these resistors in combination with capacitor $C_6$, all of which are connected to VCO 40, which determines the nominal frequency of the high frequency square wave generated by the VCO at its OUT terminal. When the $\overline{Q}_1$ output becomes a "0", diode $D_{17}$ conducts to thereby connect resistor $R_{53}$ in combination with resistors $R_{43}$ and $R_{44}$. This connection lowers the overall resistance of the combination thereby increasing the frequency of the square wave generated by the VCO. This square wave is used to control the firing rate of the SCR's in inverter 20. Thus, as long as the $\overline{Q}_1$ output of circuit 78 is a "0", the SCR's of inverter 20 fire at a rate which is faster than the normal firing rate.

As described above, when capacitor $C_8$ charges to the voltage of diode $D_{16}$, the diode conducts. Diode $D_{16}$ is connected to the base of a transistor $Q_5$ which has its emitter connected to ground and its collector connected directly to the base of a transistor $Q_6$. The collector of $Q_5$ is also connected by a resistor $R_{51}$ to OV. The transistor $Q_6$ has its emitter also connected to ground and its collector connected both to OV by a resistor $R_{52}$ and directly to the reset ($R_1$) input of circuit 78. Transistor $Q_5$ conducts only upon the conduction of zener diode $D_{16}$. Transistor $Q_6$, on the other hand, is always conductive, except for the period of time that transistor $Q_5$ conducts. The going into conduction of transistor $Q_5$ causes transistor $Q_6$ to turn off, thereby causing the voltage at the collector of $Q_6$ to go high. Therefore, the voltage at the $R_1$ input of circuit 78 also goes high to thereby reset the flip-flop.

When the flip-flop resets, the $\overline{Q}_1$ output changes from a "0" to a "1". Diode $D_{17}$ ceases to conduct and resistor $R_{53}$ is disconnected from the combination of resistors $R_{43}$ and $R_{44}$. The $Q_1$ output changes from a "1" to a "0", shutting off the flow of charging current in resistor $R_{50}$. The frequency of the square wave generated by VCO 40 returns to its nominal value, and the SCR's of inverter 20 no longer are fired at the higher rate. With the $Q_1$ output now a "0", capacitor $C_8$ begins to discharge through resistor $R_{50}$. As the voltage across capacitor $C_8$ begins to drop, diode $D_{16}$ stops conducting. Transistor $Q_5$ is turned off which in turn allows $Q_6$ to once again become conductive.

Figure 6:
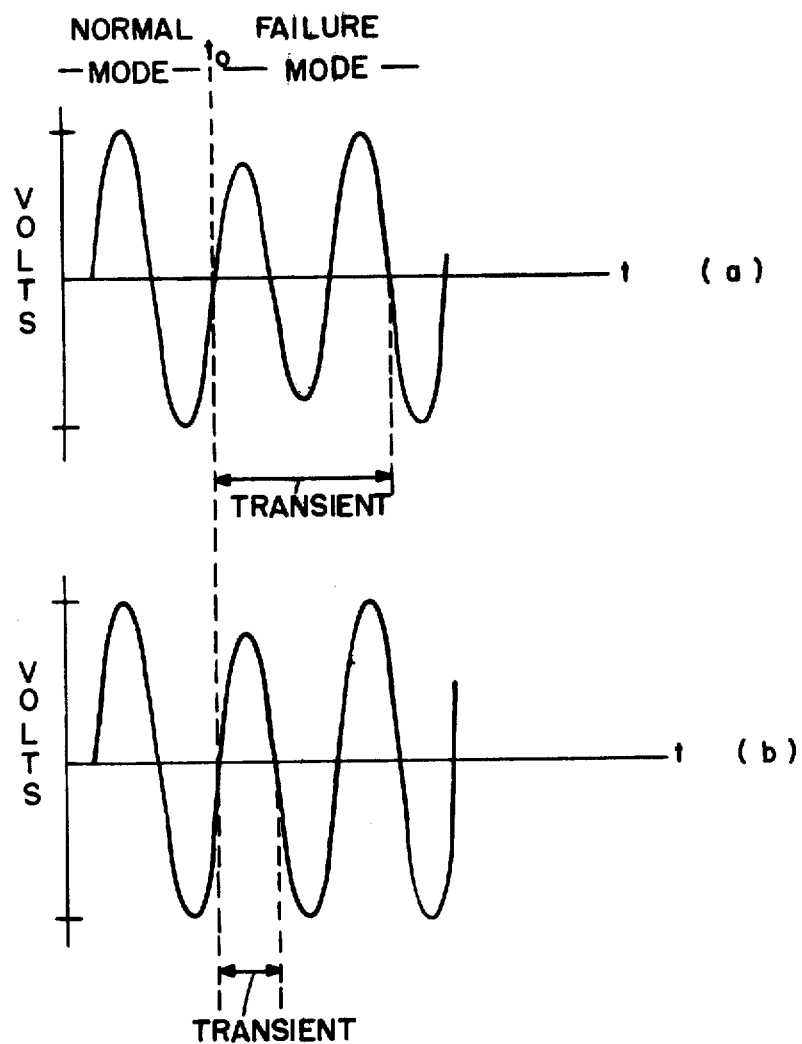
FIGS. 6a and 6b are waveforms showing the system output voltage before and after compensation, respectively.

Referring to FIGS. 6a and 6b there are shown waveforms of the output voltage of system 10 as the system switches from the normal to the failure mode of operation. The Figures show the output voltage for a system 10 operating with a full external load in the normal mode providing a maximum allowable value of charging current to battery 20. Therefore, for both FIGS. 6a and 6b, system 10 is operating in the normal mode with the maximum total load.

At the time designated as $t_o$ in both Figures, the system switches from the normal to the failure mode of operation. The combination of inverter 20 and battery 34 must now supply the load. This sudden transfer of system load to the inverter causes the output voltage to momentarily decrease. FIG. 6a shows the transient which occurs in the output voltage in a system 10 which does not include transfer compensation circuit 110. FIG. 6b shows the transient which occurs in the output voltage in a system 10 which includes transfer compensation circuit 110. A comparison of FIGS. 6a and 6b shows the effect of the compensation provided by circuit 110. Without compensation the transient condition has a duration which is equivalent to about 1⅜ cycles of the 60 Hz output voltage. With compensation the transient condition has a duration which is equivalent to about ⅜ of a cycle of the output voltage. Without compensation the peak value of the output voltage dips by as much as 30% from its normal value and even one cycle later is still more than 10% below its normal peak value. With compensation the peak value dips by about 20% from its normal value and by the next half cycle has returned to its normal value.

In a compensation circuit constructed in accordance with the present invention and used in a system 10 of the type shown in FIG. 1, the conductive voltage of diode $D_{16}$ was selected to be 6.8 V. The resistance of resistor $R_{50}$ was selected to be $169 \times 10^3$ ohms and the capacitance of capacitor $C_8$ was selected to be 0.015 microfarad. The voltage at the $Q_1$ output of circuit 78 was 15 volts when that output was a "1". The voltage on capacitor $C_8$ when system 10 operated in the normal mode ranges from about 6.8 V at relatively light total load to 0 V at relatively heavy total load.

While the operation of circuit 110 has been described in connection with a resistor $R_{53}$ having a fixed value of resistance, it should be appreciated that the resistance need not be fixed but may also vary as a function of total load. For example, a variable resistance may be provided by the combination of one or more suitably arranged solid state devices, the output one of which is driven into conduction upon the $Q_1$ output of circuit 78 becoming a "1". The level of conduction of that device would depend upon the voltage across capacitor $C_8$ at the instant system 10 transfers from the normal to the failure mode. As the voltage on capacitor $C_8$ varies as a function of total system load and as more compensation would be needed for heavier loads, the resistance would have to vary in a manner so as to increase the frequency of the square wave generated by VCO 40 more for heavier loads than for light loads.

It should also be appreciated that while the operation of circuit 110 has been described in connection with the system shown in FIGS. 1 to 4, circuit 110 may be used in any A-C power system which switches from conventional A-C voltage to a backup A-C voltage even if the battery included therein does not present a load to the system in the normal mode of operation. The only requirements for the use of circuit 110 are a signal in the system which may be used to represent on a continual basis the total load on the system in the normal mode and an ability to control the rate at which the switching elements in the inverter are fired during the transfer from normal operation to the failure mode of operation.

It is to be understood that the description of this preferred embodiment is intended to be only illustrative, rather than exhaustive, of the present invention. Those of ordinary skill will be able to make certain additions, deletions, and/or modifications to embodiments of the disclosed subject matter without departing from the spirit of the invention or its scope, as defined by the appended claims.

What is claimed is:

1. A circuit for compensating for the transients which arise in the output voltage of an A-C power system, said system of the type which provides to an external load connected to its output a regulated A-C voltage from an input A-C voltage when said system operates in the normal mode and from the output of a standby power system included therein when said system operates in the failure mode, only when said system transfers from said normal mode to said failure mode upon the occurrence of at least one of a predetermined number of undesirable conditions in said input A-C voltage said system including means for providing a signal which may be used to indicate the size of at least said external load when said system operates in the normal mode and means for controlling said standby output voltage at a predetermined amplitude when said system operates in the failure mode, said circuit comprising:
(a) means responsive to said load indicating signal for generating a signal whose normal mode amplitude is indicative of at least said external load;
(b) means responsive to the transfer of said system from said normal mode to said failure mode for providing a signal to said generating means for changing said load indicative signal amplitude in a predetermined manner;
(c) means responsive to said system transfer for causing said standby power system output voltage amplitude to increase above said failure mode predetermined amplitude; and
(d) means responsive to said load indicative signal amplitude reaching a predetermined amplitude for terminating said increase of said standby power system output voltage amplitude said standby voltage amplitude returning to said predetermined amplitude.

2. The circuit of claim 1 wherein said generating means includes means responsive to said load indicating signal for generating said load indicative signal as a D-C signal.

3. The circuit of claim 2 wherein said changing means includes means for storing said D-C signal.

4. The circuit of claim 3 wherein said signal storing means is a capacitor and said changing means further includes means for changing the voltage across said capacitor at a predetermined rate in response to said transfer.

5. The circuit of claim 1 wherein said standby power system includes an inverter connected between a battery and said output said inverter generating said standby output voltage with an amplitude which is controlled by a signal generated at a rate controlled by said controlling means, said increasing means including means responsive to said system transfer for generating a signal, said signal causing said controlling means to change said rate of said controlling means generated signal in a predetermined manner to thereby increase said standby voltage above said predetermined level.

6. The circuit of claim 5 wherein said terminating means includes means responsive to said load indicative signal reaching a predetermined amplitude for generating a signal to said means included in said increasing means, said signal causing said means to terminate said rate changing signal.

7. The circuit of claim 6 wherein said generating means includes means responsive to said load indicating signal for generating said load indicative signal as a D-C signal.

8. The circuit of claim 7 wherein said changing means includes means for storing said D-C signal.

9. The circuit of claim 8 wherein said signal storing means is a capacitor and said changing means further includes means for changing the voltage across said capacitor at a predetermined rate in response to said transfer.

10. The circuit of claim 9 wherein said terminating means includes means connected to said capacitor for becoming conductive when said load indicative signal reaches said predetermined amplitude.

11. The circuit of claim 10 wherein said terminating means further includes means responsive to the conduction of said capacitor connected means for generating said terminating signal to said means included in said increasing means.

12. A power supply system having an input and an output connected by an A-C voltage transmission means for providing at said output a regulated A-C voltage to an external load connected to said output, which comprises:
(a) sensing means to sense the A-C voltage waves in said transmission means on the input and output sides of said system, said sensing means being directly connected to said transmission means whereby there is no substantial phase shift between said transmission means and said sensing means;
(b) means responsive only to said input A-C voltage wave for determining the occurrence in said input voltage wave of at least one of a predetermined number of undesirable conditions, said means generating a first signal of predetermined amplitude upon said occurrence and a second signal of predetermined amplitude upon the nonoccurrence of said undesirable conditions;
(c) a switch means interposed in said transmission means between said input and output thereof, said switch means normally operating in a closed condition and being adapted to be selectively inhibited, upon the occurrence of said first signal, to thereby prevent transmission of said input A-C voltage wave to said output;
(d) a standby power system including a bidirectional inverter connected between a battery and said output, said inverter adapted to supply from said battery an A-C voltage wave of predetermined frequency and amplitude to said output during periods when said switch means is inhibited and said inverter adapted to supply current to charge said battery as a load internal to said system when said switch means is operating normally;
(e) a phase control means operating in a loop between said input and said output, said loop being the only loop in said system and fully closed when said switch means operates in a closed condition, said phase control means responsive when said loop is fully closed to said input and output voltage waves and said second signal for controlling the phase relationship between said voltage waves and for generating a signal which may be used to indicate the total load on said system when said switch means operates normally as the sum of said external load, said phase control means responsive to said first signal for fully opening said fully closed loop and for controlling said frequency and amplitude of said A-C voltage wave supplied by said standby power system; and (f) a circuit for compensating for the transients which arise in the output voltage when said switch means is inhibited including
  (i) means responsive to said total load indicating signal for generating a signal when said switch means operates normally whose amplitude is indicative of said total load;
  (ii) means responsive to said selective inhibiting of said switch means for providing a signal to said generating means for changing said load indicative signal amplitude in a predetermined manner;
  (iii) means responsive to said selective inhibiting of said switch means for causing said voltage supplied by said inverter when said switch means is inhibited to increase above said predetermined amplitude; and
  (iv) means responsive to said load indicative signal amplitude reaching a predetermined amplitude for terminating said increase of said voltage generated by said inverter said voltage returning to said predetermined amplitude.

13. The circuit of claim 12 wherein said generating means includes means responsive to said load indicating signal for generating said load indicative signal as a D-C signal.

14. The circuit of claim 13 wherein said changing means includes means for storing said D-C signal.

15. The circuit of claim 14 wherein said signal storing means is a capacitor and said changing means further includes means for changing the voltage across said capacitor at a predetermined rate in response to said transfer.

16. A method for compensating for the transients which arise in the output voltage of an A-C power system, said system of the type which provides to an external load connected to its output a regulated A-C voltage from an input A-C voltage when said system operates in the normal mode and from the output of a standby power system included therein when said system operates in the failure mode, only when said system transfers from said normal mode to said failure mode upon the occurrence of at least one of a predetermined number of undesirable conditions in said input A-C voltage said system including means for providing a signal which may be used to indicate the size of at least said external (the) load when said system operates in the normal mode and means for controlling said standby output voltage at a predetermined amplitude when said system operates in the failure mode, said method comprising the steps of:

(a) generating from said load indicating signal a signal whose normal amplitude is indicative of at least said external system load;
(b) changing said load indicative signal amplitude in a predetermined manner from said normal mode amplitude to a predetermined amplitude when said system transfers from said normal mode to said failure mode;
(c) increasing said standby power system output voltage amplitude above said failure mode predetermined amplitude in response to said system transfer; and
(d) terminating said increase of said standby system output voltage amplitude when said load indicative signal reaches a predetermined amplitude said standby voltage amplitude returning to said predetermined amplitude.

* * * * *